United States Patent [19]
Ohashi

[11] Patent Number: 5,630,188
[45] Date of Patent: May 13, 1997

[54] LIGHTING TYPE BRIGHT FRAME FINDER

[75] Inventor: Kazuyasu Ohashi, Funabashi, Japan

[73] Assignee: Ricoh Company, Ltd., Tokyo, Japan

[21] Appl. No.: 351,704

[22] Filed: Dec. 8, 1994

[30] Foreign Application Priority Data

Feb. 10, 1994 [JP] Japan ................................. 6-016797

[51] Int. Cl.⁶ ............................. G03B 13/04; G03B 13/08
[52] U.S. Cl. ......................................... 396/385; 396/384
[58] Field of Search ............................. 354/219, 224, 354/225; 396/386

[56] References Cited

U.S. PATENT DOCUMENTS

| | | | |
|---|---|---|---|
| 4,387,967 | 6/1983 | Yamazaki et al. | 354/423 |
| 4,707,098 | 11/1987 | Wakamiya | 354/219 |
| 4,828,381 | 5/1989 | Shindo | 351/211 |
| 4,926,201 | 5/1990 | Mukai et al. | 354/219 |
| 4,952,956 | 8/1990 | Kikuchi | 354/224 |
| 4,957,356 | 9/1990 | Oizumi et al. | 350/574 |
| 4,999,658 | 3/1991 | Kamitani et al. | 354/225 |
| 5,034,763 | 7/1991 | Inbata | 354/219 |
| 5,317,451 | 5/1994 | Hasushita | 359/643 |

FOREIGN PATENT DOCUMENTS

| | | |
|---|---|---|
| 3806942 | 9/1988 | Germany. |
| 56-101132 | 8/1981 | Japan. |
| 5-93856 | 4/1993 | Japan. |

OTHER PUBLICATIONS

Lens Design Fundamentals, pp. 2, 3, 36, 37, and 335–345, 1978, Rudolf Kingslake.

*Primary Examiner*—Safet Metjahic
*Assistant Examiner*—Christopher E. Mahoney
*Attorney, Agent, or Firm*—Oblon, Spivak, McClelland, Maier & Neustadt, P.C.

[57] ABSTRACT

A lighting type bright frame finder has as objective lens having a negative focal length; an eyepiece having a positive focal length; a frame; and a joining prism joined through a half mirror. An optical path from the frame to the eyepiece is formed by arranging the joining prism such that the half mirror is located between the objective lens and the eyepiece. The lighting type bright frame finder is constructed such that a visual field image is overlapped with a frame image formed by only the eyepiece so as to observe these images. The focal length $f_e$ of the eyepiece, a distance E from an eye pupil side lens face of the eyepiece to an eye pupil face, and a maximum emitting angle $\theta$ satisfy the following condition (1).

$$f_e/(E \cdot \tan\theta) < 7.5 \qquad (1)$$

In this lighting type bright frame finder, the number of constructional lenses can be reduced and the finder can be made compact. Other lighting type bright frame finders are also shown.

5 Claims, 5 Drawing Sheets

ASTIGMATISM (dpt)

DISTORTIONAL ABERRATION (%)

COMATIC ABERRATION (deg)

ASTIGMATISM (dpt)

DISTORTIONAL ABERRATION (%)

COMATIC ABERRATION (deg)

ASTIGMATISM (dpt)

DISTORTIONAL ABERRATION (%)

COMATIC ABERRATION (deg)

ASTIGMATISM (dpt)

DISTORTIONAL ABERRATION (%)

COMATIC ABERRATION (deg)

LIGHTING TYPE BRIGHT FRAME FINDER

BACKGROUND OF THE INVENTION

1. Field of the Invention

The present invention relates to a lighting type bright frame finder usable as each of finders of a lens shutter camera, a video camera, etc.

2. Description of the Related Art

A frame is generally evaporated and formed on an eyepiece in an Albada type finder widely used in a lens shutter camera. Accordingly, the frame cannot be moved and switched in this finder.

There is a lighting type bright frame finder for moving and switching frames. This lighting type bright frame finder can solve such a problem. For example, general examples of this lighting type bright frame finder are shown in Japanese Patent Application Laying Open (KOKAI) Nos. 5-93856 and 56-101132, etc.

In these lighting type bright frame finders, a dedicated lens is required in addition to an eyepiece to observe a frame image. Accordingly, there are many constructional lenses constituting each of the lighting type bright frame finders so that it is difficult to make each of the finders compact and reduce cost of each of the finders.

SUMMARY OF THE INVENTION

It is therefore a first object of the present invention to provide a novel lighting type bright frame finder for reducing the number of constructional lenses.

A second object of the present invention is to provide a compact lighting type bright frame finder.

A third object of the present invention is to provide a novel lighting type bright frame finder for attaching a frame onto the front face of a camera without any difficulty.

A fourth object of the present invention is to provide a novel compact lighting type bright frame finder for preferably correcting aberrations so as to observe a preferable finder image.

A fifth object of the present invention is to provide a novel compact lighting type bright frame finder for effectively preventing the diopter of a peripheral portion of a frame image from being excessively increased (plus).

A sixth object of the present invention is to provide a novel lighting type bright frame finder for reducing cost thereof.

A first construction of the present invention resides in a lighting type bright frame finder comprising:

an objective lens having a negative focal length;

an eyepiece having a positive focal length;

a frame; and a joining prism joined through a half mirror;

an optical path from the frame to the eyepiece being formed by arranging the joining prism such that the half mirror is located between the objective lens and the eyepiece;

the lighting type bright frame finder being constructed such that a visual field image is overlapped with a frame image formed by only the eyepiece so as to observe these images; and the focal length $f_e$ of the eyepiece, a distance E from an eye pupil side lens face of the eyepiece to an eye pupil face, and a maximum emitting angle $\theta$ satisfying the following condition (1).

$$f_e/(E \cdot \tan\theta) < 7.5 \tag{1}$$

A second construction of the present invention resides in a lighting type bright frame finder comprising:

an objective lens having a negative focal length;

an eyepiece having a positive focal length;

a frame; and a Joining prism joined through a half mirror;

an optical path from the frame to the eyepiece being formed by arranging the joining prism such that the half mirror is located between the objective lens and the eyepiece;

the lighting type bright frame finder being constructed such that a visual field image is overlapped with a frame image formed by only the eyepiece so as to observe these images; and the focal length $f_e$ of the eyepiece, a real optical path length L within the joining prism in the optical path from the frame to the eyepiece, and a refractive index $n_p$ of the joining prism satisfying the following condition (2).

$$L/(n_p \cdot f_e) > 0.7 \tag{2}$$

In a third construction of the present invention, the focal length $f_e$ of the eyepiece, a real optical path length L within the joining prism in the optical path from the frame to the eyepiece, and a refractive index $n_p$ of the joining prism satisfy the following condition (2) in the first construction.

$$L/(n_p \cdot f_e) > 0.7 \tag{2}$$

A fourth construction of the present invention resides in a lighting type bright frame finder comprising:

an objective lens having a negative focal length;

an eyepiece having a positive focal length;

a frame; and a joining prism joined through a half mirror;

an optical path from the frame to the eyepiece being formed by arranging the joining prism such that the half mirror is located between the objective lens and the eyepiece;

the lighting type bright frame finder being constructed such that a visual field image is overlapped with a frame image formed by only the eyepiece so as to observe these images;

the objective lens being constructed by first and second lenses sequentially arranged in an order from an object side toward an eye pupil side;

each of the first and second lenses being constructed by a negative lens such that each of object side faces of the first and second lenses is formed by an aspherical surface; and $X_1(H)$ and $C_1$ of the object side face of the first lens, and $X_3(H)$ and $C_3$ of the object side face of the second lens satisfying the following conditions (3) and (4)

$$X_1(H) > C_1 H^2 / \{1 + \sqrt{(1 - C_1^2 H^2)}\} \tag{3}$$

$$X_3(H) < C_3H^2/\{1 + \sqrt{(1 - C_3^2H^2)}\ \} \tag{4}$$

when an X-axis is set to a direction in which an intersecting point between the aspherical lens surface and an optical axis is set to an origin and the X-axis is positive toward the eye pupil side;

H is set to a height of the aspherical lens surface in a direction perpendicular to the optical axis;

X(H) is set to the aspherical lens surface; and

C is set to curvature of the aspherical lens surface on the optical axis and is equal to 1/r when r is set to a radius of curvature of the aspherical lens surface on the optical axis.

In a fifth construction of the present invention, the objective lens in each of the first to third constructions is constructed by first and second lenses sequentially arranged in an order from an object side toward an eye pupil side. Each of the first and second lenses is constructed by a negative lens such that each of object side faces of the first and second lenses is formed by an aspherical surface. $X_1(H)$ and $C_1$ of the object side face of the first lens, and $X_3(H)$ and $C_3$ of the object side face of the second lens satisfy the following conditions (3) and (4)

$$X_1(H) > C_1H^2/\{1 + \sqrt{(1 - C_1^2H^2)}\ \} \tag{3}$$

$$X_3(H) < C_3H^2/\{1 + \sqrt{(1 - C_3^2H^2)}\ \} \tag{4}$$

when an X-axis is set to a direction in which an intersecting point between the aspherical lens surface and an optical axis is set to an origin and the X-axis is positive toward the eye pupil side;

H is set to a height of the aspherical lens surface in a direction perpendicular to the optical axis;

X(H) is set to the aspherical lens surface; and

C is set to curvature of the aspherical lens surface on the optical axis and is equal to 1/r when r is set to a radius of curvature of the aspherical lens surface on the optical axis.

A sixth construction of the present invention resides in a lighting type bright frame finder comprising:

an objective lens having a negative focal length;

an eyepiece having a positive focal length;

a frame; and a joining prism joined through a half mirror;

an optical path from the frame to the eyepiece being formed by arranging the joining prism such that the half mirror is located between the objective lens and the eyepiece;

the lighting type bright frame finder being constructed such that a visual field image is overlapped with a frame image formed by only the eyepiece so as to observe these images;

the eyepiece being constructed by one positive lens such that an object side face of the eyepiece is formed by an aspherical surface; and $X_7(H)$ and $C_7$ of the object side face of the eyepiece satisfying the following condition (5)

$$X_7(H) < C_7H^2/\{1 + \sqrt{(1 - C_7^2H^2)}\ \} \tag{5}$$

when an X-axis is set to a direction in which an intersecting point between the aspherical lens surface and an optical axis is set to an origin and the X-axis is positive toward an eye pupil side;

H is set to a height of the aspherical lens surface in a direction perpendicular to the optical axis;

X(H) is set to the aspherical lens surface; and

C is set to curvature of the aspherical lens surface on the optical axis and is equal to 1/r when r is set to a radius of curvature of the aspherical lens surface on the optical axis.

In a seventh construction of the present invention, the eyepiece in each of the first to fifth constructions is constructed by one positive lens such that an object side face of the eyepiece is formed by an aspherical surface; and $X_7(H)$ and $C_7$ of the object side face of the eyepiece satisfy the following condition (5)

$$X_7(H) < C_7H^2/\{1 + \sqrt{(1 - C_7^2H^2)}\ \} \tag{5}$$

when an X-axis is set to a direction in which an intersecting point between the aspherical lens surface and an optical axis is set to an origin and the X-axis is positive toward an eye pupil side;

H is set to a height of the aspherical lens surface in a direction perpendicular to the optical axis;

X(H) is set to the aspherical lens surface; and

C is set to curvature of the aspherical lens surface on the optical axis and is equal to 1/r when r is set to a radius of curvature of the aspherical lens surface on the optical axis.

An eighth construction of the present invention resides in a lighting type bright frame finder comprising:

an objective lens having a negative focal length;

an eyepiece having a positive focal length;

a frame; and a joining prism joined through a half mirror;

an optical path from the frame to the eyepiece being formed by arranging the joining prism such that the half mirror is located between the objective lens and the eyepiece;

the lighting type bright frame finder being constructed such that a visual field image is overlapped with a frame image formed by only the eyepiece so as to observe these images; and the joining prism being formed by a plastic material as a molded product.

In a ninth construction of the present invention, the joining prism is formed by a plastic material as a molded product in each of the first to seventh constructions.

The above first object can be achieved by each of the first to ninth constructions of the present invention. Namely, the number of constructional lenses is reduced in each of the first to ninth constructions.

The above second object can be achieved by the first construction. Namely, the lighting type bright frame finder is made compact in the first construction.

The above third object can be achieved by each of the second and third constructions. Namely, a frame can be attached onto the front face of a camera without any difficulty.

The above fourth object can be achieved by each of the fourth and fifth constructions. Namely, the lighting type bright frame finder can be made compact and can preferably correct aberrations so as to observe a preferable finder image.

The above fifth object can be achieved by each of the sixth and seventh constructions. Namely, the lighting type bright frame finder is made compact and effectively prevents the diopter of a peripheral portion of a frame image from being excessively increased (plus).

The above sixth object can be achieved by each of the eighth and ninth constructions. Namely, cost of the lighting type bright frame finder can be reduced.

Further objects and advantages of the present invention will be apparent from the following description of the preferred embodiments of the present invention as illustrated in the accompanying drawings.

DESCRIPTION OF THE PREFERRED EMBODIMENTS

Figure 1:
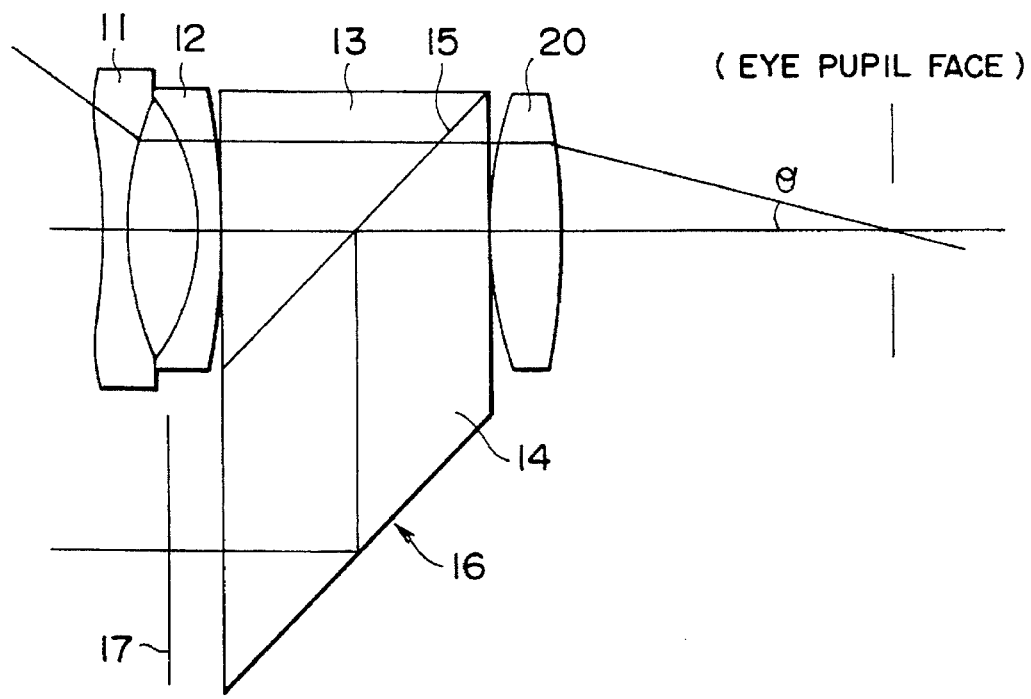
FIG. 1 is a view showing the optical arrangement of a lighting type bright frame finder in accordance with an embodiment 1 of the present invention.

The preferred embodiments of a lighting type bright frame finder in the present invention will next be described in detail with reference to the accompanying drawings.

A lighting type bright frame finder of the present invention has an objective lens, an eyepiece, a frame and a joining prism.

The objective lens has a negative focal length and the eyepiece has a positive focal length.

The joining prism is joined through a half mirror and is arranged such that the half mirror is located between the objective lens and the eyepiece. Thus, an optical path from the frame to the eyepiece is formed. Namely, an optical path on a frame side is joined by the joining prism to the optical path from the objective lens to the eyepiece.

A combination of the objective lens, the joining prism and the eyepiece is called a finder system in the following description. A combination of the frame, the joining prism and the eyepiece is called a frame system in the following description.

Since the frame system is formed by combining the frame, the joining prism and the eyepiece with each other, a frame image is a virtual image formed by only the eyepiece and can be overlapped with a visual field image formed by the finder system so as to observe these frames.

In a first construction of the lighting type bright frame finder in the present invention, the focal length $f_e$ of the eyepiece, a distance E from an eye pupil side lens face of the eyepiece to an eye pupil face, and a maximum emitting angle $\theta$ satisfy the following condition (1).

$$f_e/(E \cdot \tan\theta) < 7.5 \tag{1}$$

The above maximum emitting angle $\theta$ is set to ½ times an apparent field angle. The apparent field angle which corresponds to the field of view refers to a visible or observable area by a fixed eye or an optical instrument. The (angle) size of the field of view is determined based on an aberration of an optical system and a position and size of a field stop.

In a second construction of the lighting type bright frame finder in the present invention, the focal length $f_e$ of the eyepiece, a real optical path length L within the joining prism in the optical path from the frame to the eyepiece, and a refractive index $n_p$ of the joining prism satisfy the following condition (2).

$$L/(n_p f_e) > 0.7 \tag{2}$$

In a third construction of the lighting type bright frame finder in the present invention, the focal length $f_e$ of the eyepiece, a distance E from an eye pupil side lens face of the eyepiece to an eye pupil face, and a maximum emitting angle $\theta$, a real optical path length L within the joining prism in the optical path from the frame to the eyepiece, and a refractive index $n_p$ of the joining prism satisfy the following conditions (1) and (2).

$$f_e/(E \cdot \tan\theta) < 7.5 \tag{1}$$

$$L/(n_p f_e) > 0.7 \tag{2}$$

In each of fourth to seventh constructions of the lighting type bright frame finder in the present invention, an aspherical surface is used as a lens face. When the aspherical surface is used as a lens face, an X-axis is set to a direction in which an intersecting point between the aspherical lens surface and an optical axis is set to an origin and the X-axis is positive toward an eye pupil side. Further, H is set to a height of the aspherical lens surface in a direction perpendicular to the optical axis and X(H) is set to the aspherical lens surface. Further, C is set to curvature of the aspherical lens surface on the optical axis and is equal to 1/r when r is set to a radius of curvature of the aspherical lens surface on the optical axis.

In the fourth construction of the lighting type bright frame finder in the present invention, the objective lens is constructed by first and second lenses sequentially arranged in an order from an object side toward the eye pupil side. Each of the first and second lenses is constructed by a negative lens such that each of object side faces of the first and second lenses is formed by an aspherical surface. $X_1(H)$ and $C_1$ of the object side face of the first lens, and $X_3(H)$ and $C_3$ of the object side face of the second lens satisfy the following conditions (3) and (4).

$$X_1(H) > C_1 H^2 / \{1 + \sqrt{(1 - C_1^2 H^2)}\} \tag{3}$$

$$X_3(H) < C_3H^2/\{1 + \sqrt{(1 - C_3^2H^2)}\ \} \qquad (4)$$

In accordance with the fifth construction of the present invention, the fourth construction can be similarly used in the lighting type bright frame finder having each of the above first to third constructions. Namely, in each of the first to third constructions of the present invention, the objective lens can be constructed by first and second lenses sequentially arranged in an order from the object side toward the eye pupil side. In this case, each of the first and second lenses is constructed by a negative lens such that each of object side faces of the first and second lenses is formed by an aspherical surface. Further, $X_1(H)$ and $C_1$ of the object side face of the first lens, and $X_3(H)$ and $C_3$ of the object side face of the second lens satisfy the above conditions (3) and (4).

In the sixth construction of the lighting type bright frame finder in the present invention, the eyepiece is constructed by one positive lens such that an object side face of the eyepiece is formed by an aspherical surface. $X_7(H)$ and $C_7$ of the object side face of the eyepiece satisfy the following condition (5).

$$X_7(H) < C_7H^2/\{1 + \sqrt{(1 - C_7^2H^2)}\ \} \qquad (5)$$

In accordance with the seventh construction of the present invention, the sixth construction of the present invention can be similarly used in the lighting type bright frame finder having each of the above first to fifth constructions. Namely, in each of the first to fifth constructions of the present invention, the eyepiece can be constructed by one positive lens such that an object side face of the eyepiece is formed by an aspherical surface. In this case, $X_7(H)$ and $C_7$ of the object side face of the eyepiece satisfy the following condition (5).

$$X_7(H) < C_7H^2/\{1 + \sqrt{(1 - C_7^2H^2)}\ \} \qquad (5)$$

In accordance with an eighth construction of the lighting type bright frame finder in the present invention, the joining prism is formed by a plastic material as a molded product.

In accordance with a ninth construction of the present invention, the joining prism can be also formed by a plastic material as a molded product in the lighting type bright frame finder having each of the first to seventh constructions in the present invention.

As mentioned above, in the lighting type bright frame finder of the present invention, the objective lens having a negative focal length and the eyepiece having a positive focal length constitute an inverse Galilean type finder. A frame image is overlapped with a visual field image and can be observed by the half mirror within the joining prism arranged between the objective lens and the eyepiece.

In a condition for arranging the half mirror between the objective lens and the eyepiece, it is necessary to set a distance between the objective lens and the eyepiece to be greater than an effective diameter of a ray since the half mirror is arranged such that this half mirror is inclined 45 degrees with respect to the optical axis. However, it is difficult to satisfy the condition for holding the distance between the objective lens and the eyepiece to be greater than the effective diameter of a ray when a magnification of the finder is increased while a wide field angle in a real field of view is secured. For example, it is difficult to satisfy this condition when the magnification is set to be equal to or greater than 0.4 while the field angle in the real field of view is equal to or greater than 80 degrees.

Therefore, in the present invention, the half mirror is arranged within the joining prism so that an incident height of a ray outside the optical axis is restrained and the above condition is satisfied while a wide angle state of the real field of view is held. Thus, an effective diameter of the objective lens is reduced.

In the finder of this type in the present invention, it is necessary to shorten focal lengths of the objective lens and the eyepiece so as to restrain an entire length of the finder. The above condition (1) prescribes the focal length of the eyepiece. When $f_e/(E\tan\theta)$ as a parameter in this condition (1) is equal to or greater than an upper limit of 7.5, the entire length of the finder is increased so that it is difficult to make the finder compact.

In the lighting type bright frame finder, the frame is normally arranged on a front face of a camera to lighten the finder such that this frame is adjacent to the objective lens of the finder system. In this lighting type bright frame finder of the present invention, only the eyepiece is included as a lens in the frame system and the frame image is a virtual image formed by only the eyepiece. Accordingly, when the focal length of the eyepiece is determined, the distance from the eyepiece to the frame is naturally determined in accordance with the magnification of an observed frame image.

At this time, the above condition (2) is a condition for arranging the frame without any difficulty. When $L/(n_p f_e)$ as a parameter in the condition (2) is equal to or smaller than a lower limit of 0.7, it is difficult to bend an optical path of the frame system twice perpendicularly without causing any eclipse of the light beam. Therefore, it is difficult to arrange the frame on the front face of a camera. In an embodiment 3 described later, the prism is extended along the optical path of the frame system to satisfy the condition (2).

In the inverse Galilean type finder, an eye pupil is located behind the lens system so that this optical arrangement is disadvantageous in correction of aberrations of the finder system. Accordingly, a condition for correcting the aberrations becomes further severe when the inverse Galilean type finder is made compact.

In each of the fourth and fifth constructions of the lighting type bright frame finder, the objective lens is constructed by two negative lenses and each of first and third lens faces counted from an object side is formed by an aspherical surface so as to solve the above problems. The above conditions (3) and (4) are conditions for prescribing shapes of these aspherical surfaces.

In the condition (3), the aspherical shape of an object side face of the first lens in the objective lens shows a shape formed such that negative refracting power is weakened toward a peripheral lens portion. In the condition (4), the aspherical shape of an object side face of the second lens in the objective lens shows a shape formed such that negative refracting power is strengthened toward a peripheral lens portion.

When the objective lens has such a construction, distortional aberration greatly caused by only a spherical surface can be sufficiently corrected while this distortional aberration, astigmatism, comatic aberration, etc. are balanced.

In the lighting type bright frame finder of the present invention, lenses of the frame system are constructed by only the eyepiece. Accordingly, when the focal length of the eyepiece is reduced to make the finder compact, the diopter of a peripheral portion of the frame system inevitably becomes positive (plus) in comparison with the diopter of a center of the frame system. In each of the sixth and seventh constructions of the present invention, the eyepiece is constructed by one positive lens and a lens face of the eyepiece on the object side is formed by an aspherical surface so as to effectively solve this problem.

In the above condition (5), the aspherical shape of the object side face of the eyepiece shows a shape formed such that positive refracting power is weakened toward a peripheral lens portion. When the aspherical surface having such a shape is formed as the object side face of the eyepiece, it is possible to prevent the diopter of a peripheral portion of the frame system from being excessively increased (plus).

The joining prism is used in the lighting type bright frame finder of the present invention. Use of the joining prism is disadvantageous in cost in comparison with a case in which a half mirror as a plane parallel plate is used. Therefore, in each of the eighth and ninth constructions of the present invention, the joining prism is constructed as a molded product formed by a plastic material so that cost of the material of the joining prism can be reduced.

Concrete embodiments of the present invention will next be explained.

FIG. 1 shows the optical arrangement of a lighting type bright frame finder in accordance with an embodiment 1 of the present invention. An objective lens having a negative focal length is constructed by a first lens 11 and a second lens 12 sequentially arranged from an object side to an eye pupil side. The object side is set to a left-hand side in FIG. 1. In accordance with a fourth construction of the present invention, each of the first lens 11 and the second lens 12 is constructed by a negative lens.

In accordance with a sixth construction of the present invention, an eyepiece 20 having a positive focal length is constructed by one positive lens. A joining prism 16 is arranged between the objective lens and the eyepiece 20.

The joining lens 16 is formed by joining a rectangular prism 13 to a prism 14 having a parallelogram shape in cross section through a half mirror 15. The half mirror 15 is arranged between the objective lens and the eyepiece 20 such that the half mirror 15 is inclined 45 degrees with respect to the optical axis of a finder system. Accordingly, an optical path of the finder system is directed from the objective lens to the eyepiece 20 through the prism 13, the half mirror 15 and the prism 14.

A frame 17 is arranged in a position adjacent to the objective lens. In FIG. 1, the frame 17 is arranged below the objective lens. A light beam on the optical axis of a frame system is reflected on a slanting face of the prism 14 from the frame 17 through the prism 14, and is further reflected on the half mirror 15 so that the optical axis of the frame system is joined to the optical axis of the finder system.

Concrete examples of the present invention will next be described.

In the following embodiments of the present invention, a face number is a number of a face counted from the object side. In the finder system, the face number is started from number 1 showing an object side face of the first lens 11 of the objective lens. A face number 5 shows an object side face of the joining prism 18 as an object side face of the prism 13. A face number 8 shows an eyepiece side face of the joining prism 18. A face number 8 shows an eye pupil side face of the eyepiece 20. A final face number 9 shows an eye pupil face.

Similarly, in the frame system, a face number is started from number 1 showing a frame face. Face numbers 2 and 3 respectively show a frame side face and an eyepiece side face of the joining prism 18. A final face number 8 shows an eye pupil face next to a lens face of the eyepiece 20.

In the following description, "R" shows a radius of curvature of a face corresponding to each of the face numbers. In the case of an aspherical surface, "R" shows a radius of curvature on the optical axis as a paraxial curvature radius equal to an inverse number of the above-mentioned value C. "D" shows a distance on the optical axis between two adjacent faces in a face number order. $N_d$ and $v_d$ respectively show a refractive index and an Abbe's number with respect to a d-line of each of a lens and a prism.

θ is set to the above-mentioned maximum emitting angle equal to ½ times an apparent field angle. "M" shows a paraxial magnification. As illustrated in FIG. 1, the angle θ which is the maximum emitting angle is defined from the optical axis and intersects the optical axis at a point in which an axis of the eye pupil face which is perpendicular to the optical axis intersects the optical axis.

In the following description, an X-coordinate of the aspherical surface is set to be in conformity with the optical axis, and an H-coordinate of the aspherical surface is set to be perpendicular to the optical axis. "r" is a radius of curvature of the aspherical surface on the optical axis and is equal to an inverse number of the above-mentioned value C. "K" is set to a conical constant. $A_4$, $A_6$, $A_8$ and $A_{10}$ are set to aspherical coefficients in higher orders. In this case, as is well known, the aspherical surface is a curved surface obtained by rotating a curve represented by the following formula around the optical axis.

$$X = (1/r)H^2/\{1 + \sqrt{[1-(1+K)(H/r)^2]}\ \} +$$

$$A_4 \cdot H^4 + A_6 \cdot H^6 + A_8 \cdot H^8 + A_{10} \cdot H^{10}$$

A shape of the aspherical surface is specified by providing the curvature radius, the conical constant and the higher order aspherical coefficients on the optical axis.

In notation of the higher order aspherical coefficients, E and a number subsequent to this E show power. For example, "E-04" means $10^{-4}$ and this value $10^{-4}$ is multiplied by a number located before this value.

EMBODIMENT 1

Measured data of the above values in an embodiment 1 of the present invention are shown in the following table 1.

TABLE 1 finder system

| face No. | R | D | $N_d$ | $v_d$ | remarks |
|---|---|---|---|---|---|
| 1 | −13.855 | 1.00 | 1.49154 | 57.82 | objective lens |
| 2 | 11.831 | 3.53 | | | |
| 3 | −10.984 | 1.00 | 1.49154 | 57.82 | objective lens |
| 4 | −33.425 | 0.10 | | | |
| 5 | ∞ | 12.00 | 1.49154 | 57.82 | prism |
| 6 | ∞ | 0.10 | | | |
| 7 | 17.877 | 3.27 | 1.49154 | 57.82 | eyepiece |
| 8 | −24.769 | 15.00 | | | |
| 9 | | | | | eye pupil face | aspherical coefficients

| | | | | |
|---|---|---|---|---|
| first face | K = | −21.89117 | | |
| | $A_4$ = | 1.94461E-04, | $A_6$ = | 3.43178E-06 |
| | $A_8$ = | 7.64161E-08, | $A_{10}$ = | 1.19657E-09 |
| third face | K = | 0.43808 | | |
| | $A_4$ = | −7.27291E-04, | $A_6$ = | 8.95668E-06 |
| | $A_8$ = | −4.68072E-07, | $A_{10}$ = | 7.59276E-09 |
| seventh face | K = | −0.82773 | | |
| | $A_4$ = | −2.38315E-05, | $A_6$ = | −1.53353E-07 |

TABLE 1-continued frame system

| face No. | R | D | $N_d$ | $v_d$ | remarks |
|---|---|---|---|---|---|
| 1 | ∞ | 2.73 | | | frame face |
| 2 | ∞ | 26.00 | 1.49154 | 57.82 | prism |
| 3 | ∞ | 0.10 | | | |
| 4 | 17.877 | 3.27 | 1.49154 | 57.82 | eyepiece |
| 5 | −24.769 | 15.00 | | | |
| 6 | | | | | eye pupil face | aspherical coefficients fourth face  $K = -0.82773$
$A_4 = -2.38315E-05$,  $A_6 = -1.53353E-07$
$\theta = 13.164$
$M = 0.401$
$f_e/(E \cdot \tan\theta) = 6.177$
$L/(n_P \cdot f_e) = 0.804$

EMBODIMENT 2

Measured data of the above values in an embodiment 2 of the present invention are shown in the following table 2.

TABLE 2 finder system

| face No. | R | D | $N_d$ | $v_d$ | remarks |
|---|---|---|---|---|---|
| 1 | −22.432 | 1.00 | 1.49154 | 57.82 | objective lens |
| 2 | 11.273 | 3.68 | | | |
| 3 | −13.751 | 1.00 | 1.49154 | 57.82 | objective lens |
| 4 | −117.425 | 0.10 | | | |
| 5 | ∞ | 12.00 | 1.49154 | 57.82 | prism |
| 6 | ∞ | 0.10 | | | |
| 7 | 17.168 | 3.12 | 1.49154 | 57.82 | eyepiece |
| 8 | −28.055 | 13.00 | | | |
| 9 | | | | | eye pupil face | aspherical coefficients

| first face | $K =$ | −48.83519 | | |
| | $A_4 =$ | 2.34937E-04, | $A_6 =$ | −3.88480E-07 |
| | $A_8 =$ | −8.45108E-09, | $A_{10} =$ | 3.51268E-10 |
| third face | $K =$ | 0.52697 | | |
| | $A_4 =$ | −5.48172E-04, | $A_6 =$ | 3.62212E-06 |
| | $A_8 =$ | −2.91489E-08, | $A_{10} =$ | −3.44624E-10 |
| seventh face | $K =$ | −0.60288 | | |
| | $A_4 =$ | −1.83055E-05, | $A_6 =$ | −1.91695E-07 | frame system

| face No. | R | D | $N_d$ | $v_d$ | remarks |
|---|---|---|---|---|---|
| 1 | ∞ | 3.34 | | | frame face |
| 2 | ∞ | 26.00 | 1.49154 | 57.82 | prism |
| 3 | ∞ | 0.10 | | | |
| 4 | 17.168 | 3.12 | 1.49154 | 57.82 | eyepiece |
| 5 | −28.055 | 13.00 | | | |
| 6 | | | | | eye pupil face | aspherical coefficients fourth face  $K = -0.60288$
$A_4 = -1.83055E-05$,  $A_6 = -1.91695E-07$
$\theta = 14.090$
$M = 0.431$
$f_e/(E \cdot \tan\theta) = 6.795$
$L/(n_P \cdot f_e) = 0.786$

EMBODIMENT 3

Measured data of the above values in an embodiment 3 of the present invention are shown in the following table 3.

TABLE 3 finder system

| face No. | R | D | $N_d$ | $v_d$ | remarks |
|---|---|---|---|---|---|
| 1 | −17.508 | 1.00 | 1.49154 | 57.82 | objective lens |
| 2 | 13.669 | 3.70 | | | |
| 3 | −13.684 | 1.00 | 1.49154 | 57.82 | objective lens |
| 4 | −144.274 | 0.10 | | | |
| 5 | ∞ | 12.00 | 1.49154 | 57.82 | prism |
| 6 | ∞ | 0.10 | | | |
| 7 | 17.600 | 3.10 | 1.49154 | 57.82 | eyepiece |
| 8 | −27.090 | 13.00 | | | |
| 9 | | | | | eye pupil face | aspherical coefficients

| first face | $K =$ | −28.94084 | | |
| | $A_4 =$ | 2.27232E-04, | $A_6 =$ | 2.31739E-07 |
| | $A_8 =$ | −1.81414E-08, | $A_{10} =$ | 4.37716E-10 |
| third face | $K =$ | 0.75282 | | |
| | $A_4 =$ | −6.54192E-04, | $A_6 =$ | 6.80773E-06 |
| | $A_8 =$ | −1.35843E-07, | $A_{10} =$ | 1.53849E-09 |
| seventh face | $K =$ | −0.75306 | | |
| | $A_4 =$ | −1.59217E-05, | $A_6 =$ | −1.91803E-07 | frame system

Figure 2:
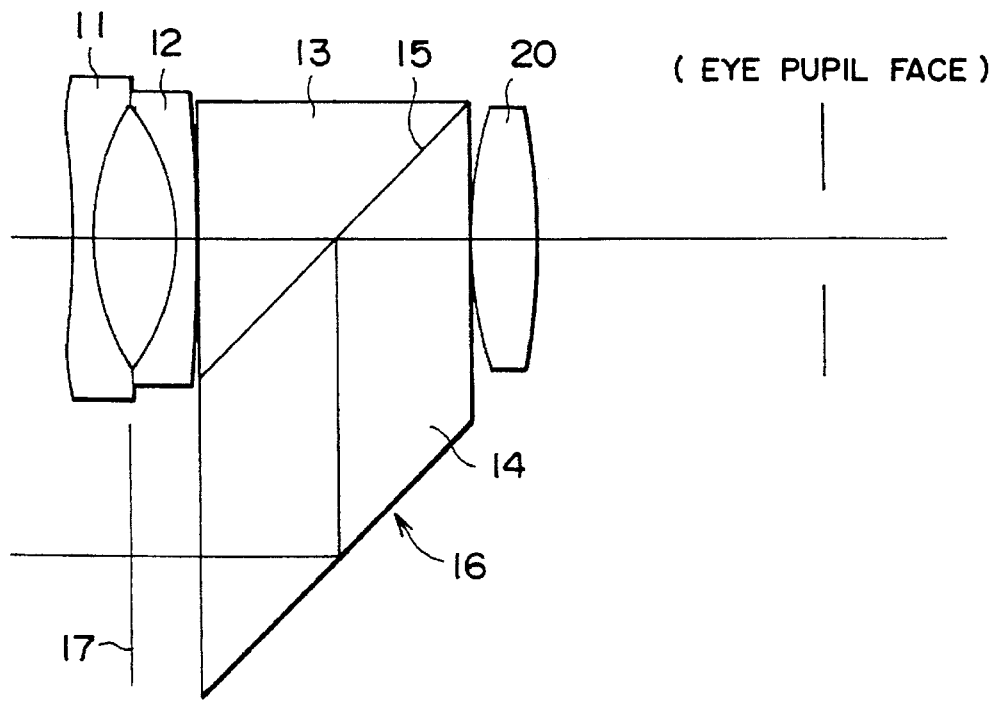
FIG. 2 is a view showing the optical arrangement of a lighting type bright frame finder in accordance with an embodiment 2 of the present invention.
Figure 3:
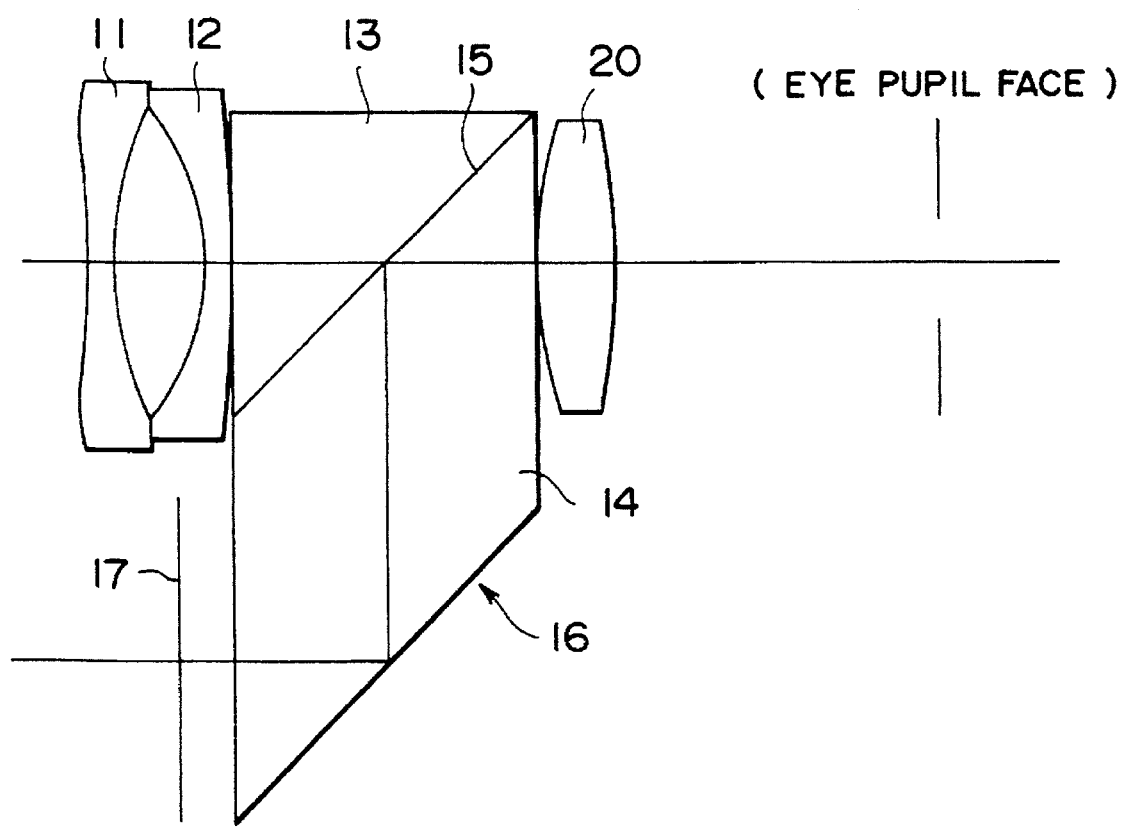
FIG. 3 is a view showing the optical arrangement of a lighting type bright frame finder in accordance with an embodiment 3 of the present invention.
Figure 4A:
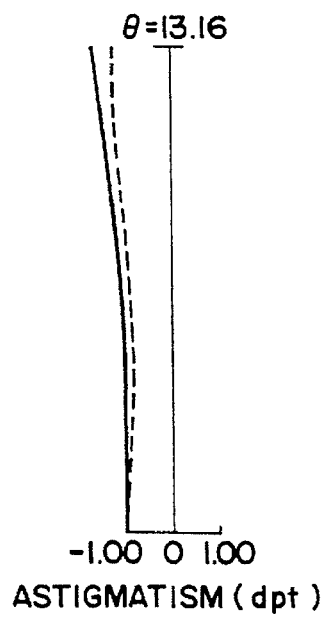
FIGS. 4a to 4c are diagrams relating to a finder system and respectively showing curves of astigmatism, distortional aberration and comatic aberration with respect to the embodiment 1.
Figure 4B:
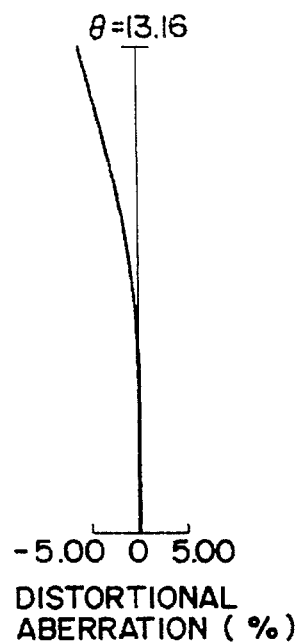
Figure 4C:
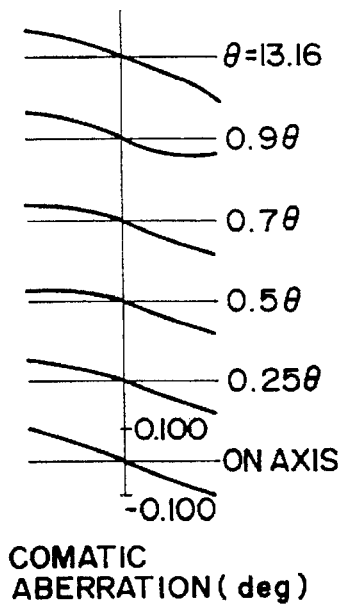
Figure 4D:
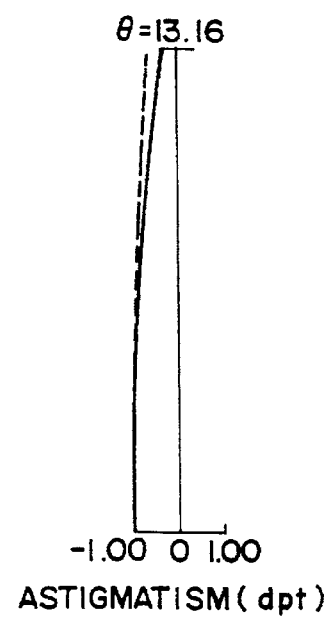
FIGS. 4d to 4f are diagrams relating to a frame system and respectively showing curves of astigmatism, distortional aberration and comatic aberration with respect to the embodiment 1.
Figure 4E:
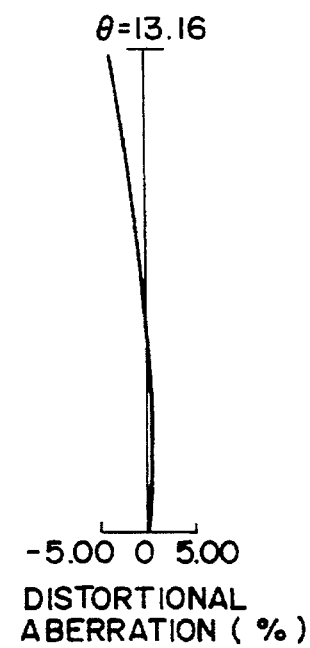
Figure 4F:
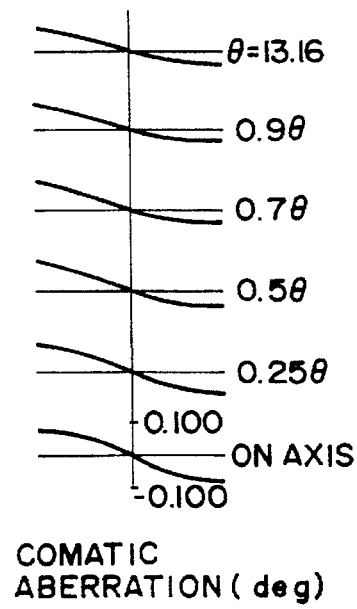
Figure 5A:
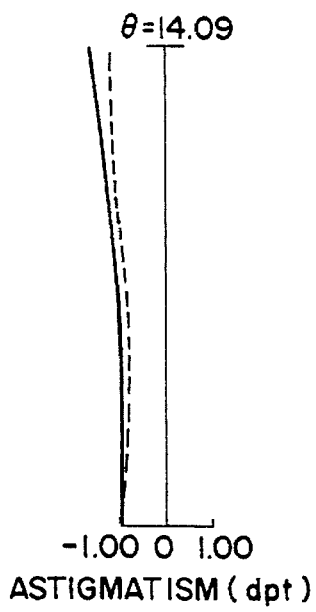
FIGS. 5a to 5c are diagrams relating to a finder system and respectively showing curves of astigmatism, distortional aberration and comatic aberration with respect to the embodiment 2.
Figure 5B:
Figure 5C:
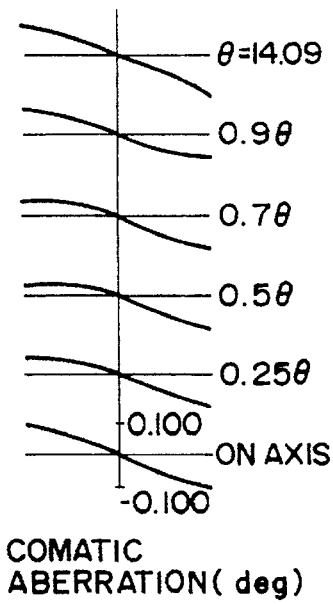
Figure 5D:
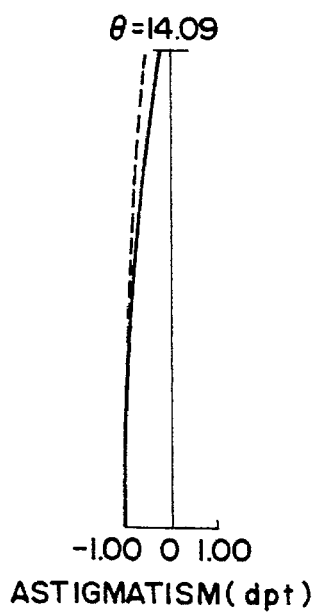
FIGS. 5d to 5f are diagrams relating to a frame system and respectively showing curves of astigmatism, distortional aberration and comatic aberration with respect to the embodiment 2.
Figure 5E:
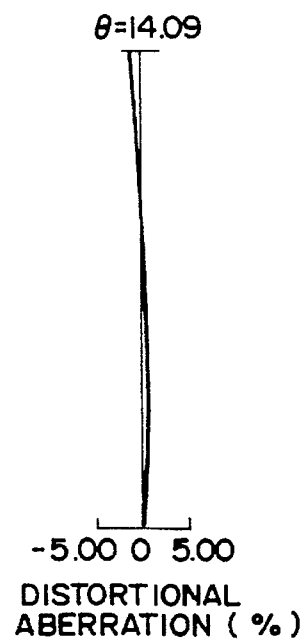
Figure 5F:
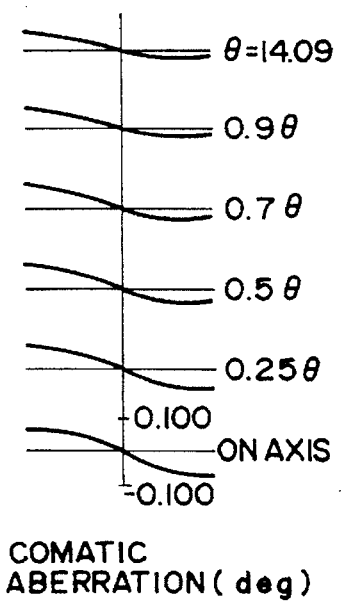
Figure 6A:
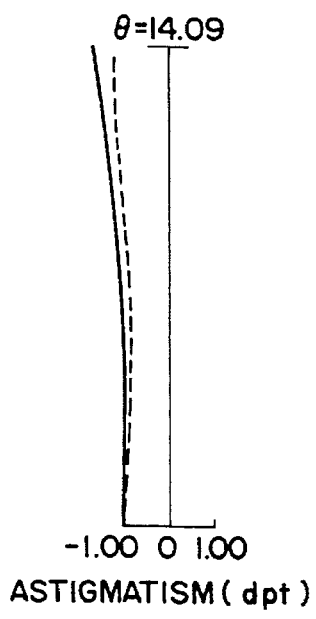
FIGS. 6a to 6c are diagrams relating to a finder system and respectively showing curves of astigmatism, distortional aberration and comatic aberration with respect to the embodiment 3.
Figure 6B:
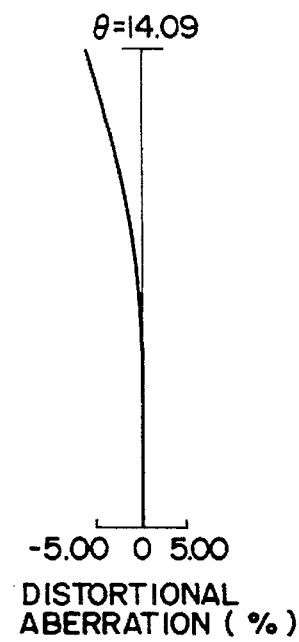
Figure 6C:
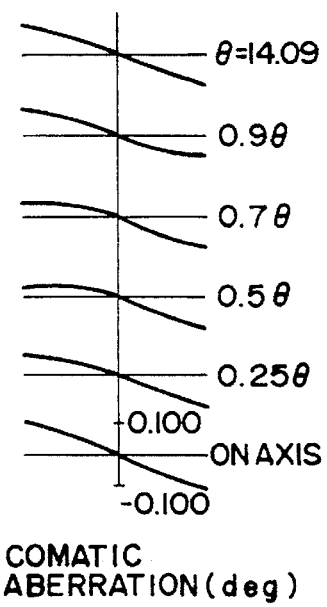
Figure 6D:
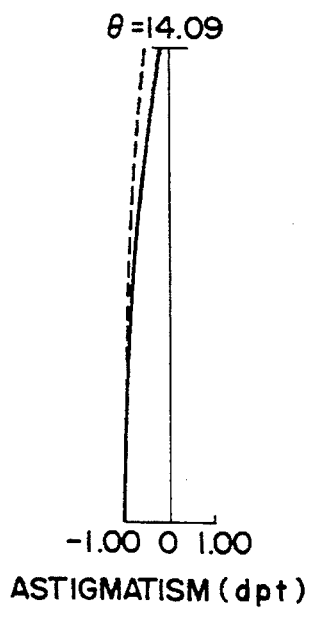
FIGS. 6d to 6f are diagrams relating to a frame system and respectively showing curves of astigmatism, distortional aberration and comatic aberration with respect to the embodiment 3.
Figure 6E:
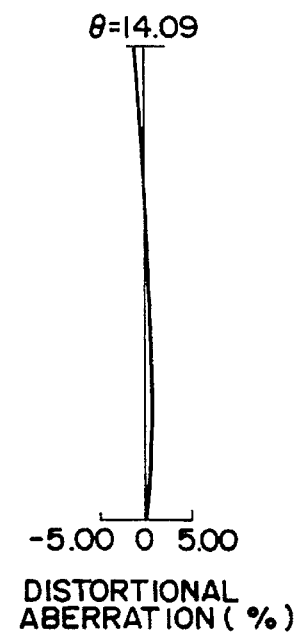
Figure 6F:
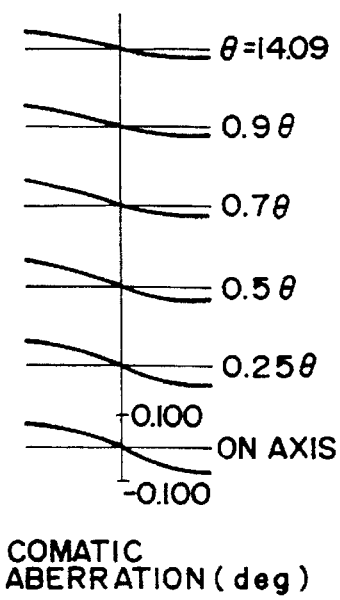

| face No. | R | D | $N_d$ | $v_d$ | remarks |
|---|---|---|---|---|---|
| 1 | ∞ | 2.35 | | | frame face |
| 2 | ∞ | 27.50 | 1.49154 | 57.82 | prism |
| 3 | ∞ | 0.10 | | | |
| 4 | 17.600 | 3.10 | 1.49154 | 57.82 | eyepiece |
| 5 | −27.090 | 13.00 | | | |
| 6 | | | | | eye pupil face | aspherical coefficients fourth face  $K = -0.75306$
$A_4 = -1.59217E-05$,  $A_6 = -1.91803E-07$
$\theta = 14.095$
$M = 0.431$
$f_e/(E \cdot \tan\theta) = 6.805$
$L/(n_P \cdot f_e) = 0.830$ FIGS. 1, 2 and 3 respectively show optical arrangements of the lighting type bright frame finder in the above embodiments 1, 2 and 3. For brevity, in FIGS. 2 and 3, constructional portions similar to those in FIG. 1 are designated by the same reference numerals as FIG. 1. The embodiments 1 to 5 relate to the first to ninth constructions of the present invention. In each of these embodiments, each of the constructional lenses and the joining prism are formed by a plastic material.

FIGS. 4, 5 and 6 respectively show aberrational curves with respect to the embodiments 1, 2 and 3. In FIGS. 4a to 6a and FIGS. 4d to 6d each showing astigmatism, a sagittal ray is shown by a solid line and a meridional ray is shown by a broken line. In each of the embodiments, the aberrations are sufficiently corrected so that the lighting type bright frame finder has preferable performance.

Further, in each of the embodiments, a real field of view is equal to or greater than 60 degrees so that a field angle is wide. Further, the finder has a magnification equal to or greater than 0.4 and is compact.

As mentioned above, in accordance with the novel lighting type bright frame finder of the present invention constructed above, it is not necessary to arrange a dedicated lens generally used in a frame system so that lenses in the frame system are constructed by only an eyepiece. Accordingly, the number of constructional lenses of the lighting type bright frame finder is reduced in accordance with each of the first to ninth constructions so that the lighting type bright frame finder can be made compact and cost thereof can be reduced.

In each of the second and third constructions of the lighting type bright frame finder, a frame can be attached onto the front face of a camera without any difficulty. In each of the fourth and fifth constructions of the lighting type bright frame finder, the lighting type bright frame finder is compact and a preferable finder image can be observed. In each of the sixth and seventh constructions of the lighting type bright frame finder, the lighting type bright frame finder is compact and no diopter of a peripheral portion of a frame image is excessively increased (plus). In each of the eighth and ninth constructions of the lighting type bright frame finder, cost of the lighting type bright frame finder can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. An inverse Galilean type lighting bright frame finder comprising:

an objective lens having a negative focal length;

an eyepiece having a positive focal length;

a frame; and a joining prism composed of two parts between which a half mirror is interposed, for forming an optical path from said frame to said eyepiece by being arranged such that the half mirror is located between the objective lens and the eyepiece, wherein a visual field image is overlapped with a frame image formed by only said eyepiece so as to observe these images;

the focal length $f_e$ of said eyepiece, a distance E from an eye pupil side lens face of the eyepiece to an eye pupil face, and a maximum emitting angle $\theta$ satisfying the following condition (1)

$$f_e/(E \cdot \tan\theta) < 7.5 \quad (1)$$

2. An inverse Galilean type lighting bright frame finder as claimed in claim 1, wherein the focal length $f_e$ of said eyepiece, a real optical path length L within the joining prism in said optical path from the frame to the eyepiece, and a refractive index $n_p$ of the joining prism satisfy the following condition (2)

$$L/(n_p \cdot f_e) > 0.7 \quad (2)$$

3. An inverse Galilean type lighting bright frame finder as claimed in claim 1, wherein said objective lens is constructed by first and second lenses sequentially arranged in order from an object side toward an eye pupil side;

each of the first and second lenses is constructed by a negative lens such that each of object side faces of the first and second lenses is formed by an aspherical surface; and $X_1(H)$ and $C_1$ of the object side face of said first lens, and $X_3(H)$ and $C_3$ of the object side face of said second lens satisfy the following conditions (3) and (4)

$$X_1(H) > C_1 H^2/\{1 + \sqrt{(1 - C_1^2 H^2)}\} \quad (3)$$

$$X_3(H) < C_3 H^2/\{1 + \sqrt{(1 - C_3^2 H^2)}\} \quad (4)$$

when an X-axis is set to a direction in which an intersecting point between the aspherical lens surface and an optical axis is set to an origin and the X-axis is positive toward the eye pupil side;

H is set to a height of the aspherical lens surface in a direction perpendicular to the optical axis;

X(H) is set to the aspherical lens surface; and

C is set to curvature of said aspherical lens surface on the optical axis and is equal to 1/r when r is set to a radius of curvature of the aspherical lens surface on the optical axis.

4. An inverse Galilean type lighting bright frame finder as claimed in claim 1, wherein said eyepiece is constructed by one positive lens such that an object side face of the eyepiece is formed by an aspherical surface; and $X_7(H)$ and $C_7$ of the object side face of said eyepiece satisfy the following condition (5)

$$X_7(H) < C_7 H^2/\{1 + \sqrt{(1 - C_7^2 H^2)}\} \quad (5)$$

when an X-axis is set to a direction in which an intersecting point between the aspherical lens surface and an optical axis is set to an origin and the X-axis is positive toward an eye pupil side;

H is set to a height of the aspherical lens surface in a direction perpendicular to the optical axis;

X(H) is set to the aspherical lens surface; and

C is set to curvature of said aspherical lens surface on the optical axis and is equal to 1/r when r is set to a radius of curvature of the aspherical lens surface on the optical axis.

5. An inverse Galilean type lighting bright frame finder as claimed in claim 1, wherein the joining prism is formed by a plastic material as a molded product.

* * * * *